(12) United States Patent
Kwon et al.

(10) Patent No.: US 11,529,789 B2
(45) Date of Patent: Dec. 20, 2022

(54) MOBILE TERMINAL

(71) Applicant: LG ELECTRONICS INC., Seoul (KR)

(72) Inventors: Dohyung Kwon, Seoul (KR); Donghyun Kim, Seoul (KR); Jinsu Nam, Seoul (KR); Sangwook Park, Seoul (KR); Sanghwon Jung, Seoul (KR); Bumoh Park, Seoul (KR); Sukho Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 156 days.

(21) Appl. No.: 17/043,906

(22) PCT Filed: Jul. 10, 2018

(86) PCT No.: PCT/KR2018/007786
§ 371 (c)(1),
(2) Date: Sep. 30, 2020

(87) PCT Pub. No.: WO2019/212090
PCT Pub. Date: Jul. 11, 2019

(65) Prior Publication Data
US 2021/0016538 A1    Jan. 21, 2021

(30) Foreign Application Priority Data
May 3, 2018    (KR) .................... 10-2018-0051390

(51) Int. Cl.
*B32B 3/02*    (2006.01)
*B32B 3/28*    (2006.01)
*H04M 1/02*    (2006.01)
*B32B 17/10*    (2006.01)

(52) U.S. Cl.
CPC ............... *B32B 3/28* (2013.01); *B32B 3/02* (2013.01); *B32B 17/10064* (2013.01); *H04M 1/0266* (2013.01); *B32B 2255/00* (2013.01); *B32B 2307/4023* (2013.01); *B32B 2315/08* (2013.01); *B32B 2457/20* (2013.01)

(58) Field of Classification Search
CPC ....................................................... H05K 5/03
See application file for complete search history.

(56) References Cited

FOREIGN PATENT DOCUMENTS

| CN | 206085795 U | * | 4/2017 | ............ B32B 17/06 |
|---|---|---|---|---|
| KR | 10-2011-0124534 A | | 11/2011 | |
| KR | 10-2014-0060845 A | | 5/2014 | |
| KR | 10-2015-0004496 A | | 10/2016 | |
| KR | 10-2016-0119362 A | | 10/2016 | |
| KR | 10-1845025 B1 | | 4/2018 | |

\* cited by examiner

*Primary Examiner* — Elizabeth E Mulvaney
(74) *Attorney, Agent, or Firm* — Birch, Stewart, Kolasch & Birch, LLP (57) ABSTRACT

In order to satisfy a demand for various shapes of windows of a mobile terminal and manufacture a mobile terminal with a low price, provided is a mobile terminal comprising a display panel and a window assembly disposed on the front surface of the display panel, wherein the window assembly comprises: an outer window forming a front outer appearance; an inner window disposed on the rear surface of the outer window while having a space between the outer window and the inner window; and a resin disposed in the space to fix the outer window to the inner window.

8 Claims, 9 Drawing Sheets

MOBILE TERMINAL

CROSS REFERENCE TO RELATED APPLICATIONS

This application is the National Phase of PCT International Application No. PCT/KR2018/007786, filed on Jul. 10, 2018, which claims priority under 35 U.S.C. 119(a) to Patent Application No. 10-2018-0051390, filed in the Republic of Korea on May 3, 2018, all of which are hereby expressly incorporated by reference into the present application.

TECHNICAL FIELD

The present disclosure relates to a mobile terminal having a window made of glass material on the front side of a display unit.

BACKGROUND ART

Generally, a mobile terminal includes a display panel outputting an image and a window on the front side of the display panel.

Recently, there is a need for fabricating a window of various shapes in that a display panel such as a POLED having a high degree of shape freedom is commercialized, and at the same time, a front region exposed to the outside of the window becomes a part of a design shape of the mobile terminal.

In particular, in addition to a window shape having a constant thickness of the related art, the demand for a window having a different thickness for each region is also increasing.

DETAILED DESCRIPTION OF DISCLOSURE

Technical Tasks

Typically, a desired shape of a window is obtained in a manner of deforming a window of the same thickness by compressing upper and lower molds under high temperature and pressure, and a single window formed in this manner is unable to cope with a variety of demands. In particular, it is almost impossible to obtain a shape of a window having a different thickness for each region.

In order to solve this problem, it is possible to consider semi-melt molding, which requires high temperature conditions, thus requiring development of equipment and processes, and it is difficult to satisfy the physical properties of the glass as well.

Another approach is to fabricate a window through a CNC process, but it is disadvantageous in that a thick glass should be processed under a process condition, so that a yield is low and a high cost is required.

Technical Solutions

In one technical aspect of the present disclosure, provided herein is a mobile terminal, including a display panel and a window assembly provided to a front side of the display panel, the window assembly including an outer window forming a front exterior, an inner window provided to a rear side of the outer window in a manner of forming a space apart from the outer window, and a resin provided to the space to fix the outer window and the inner window thereto.

According to another aspect of the present disclosure, in a vertical or horizontal cross section, a cross section of the outer window and a cross section of the inner window may be different from each other.

According to another aspect of the present disclosure, in the vertical or horizontal cross section of the mobile terminal, a vertical distance from the outer window to the inner window for a first spot may be different from a vertical distance from the outer window to the inner window for a second spot.

According to another aspect of the present disclosure, the outer window may include a flat front part and a bending part forming a lateral side in a manner that top, bottom left and right sides of the front part are bent on boundaries of the front part, respectively.

According to another aspect of the present disclosure, each of the outer and inner windows may have a 4-side bending shape.

According to another aspect of the present disclosure, a boundary of the outer window may be aligned with a boundary of the inner window and a sealing part may be further provided to a region in which the boundary of the outer window and the boundary of the inner window meet each other.

According to another aspect of the present disclosure, each of a thickness of the outer window and a thickness of the inner window may be uniform.

According to another aspect of the present disclosure, a front side of the outer window and a rear side of the inner window may be polished and the outer window, the resin and the inner window may have the same refractive index.

According to another aspect of the present disclosure, the mobile terminal may further include a colored print layer covering a periphery of the display panel, and the print layer may be formed on the rear side of the inner window.

Advantageous Effects

Effects or advantages of a mobile terminal according to the present disclosure are described as follows.

According to at least one of the embodiments of the present disclosure, it is advantageous in coping with various window shape requirements.

In addition, according to at least one of the embodiments of the present disclosure, it is advantageous in minimizing the scattering of the transmitted light while realizing a window of various shapes.

In addition, according to at least one of the embodiments of the present disclosure, it is advantageous in that an anti-scattering coating or an anti-scattering film applied to a conventional window can be omitted.

In addition, according to at least one of the embodiments of the present disclosure, it is advantageous in having an impact mitigation effect owing to resin.

In addition, according to at least one of the embodiments of the present disclosure, it is advantageous in that the design effect of a mobile terminal can be increased.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BEST MODE FOR DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
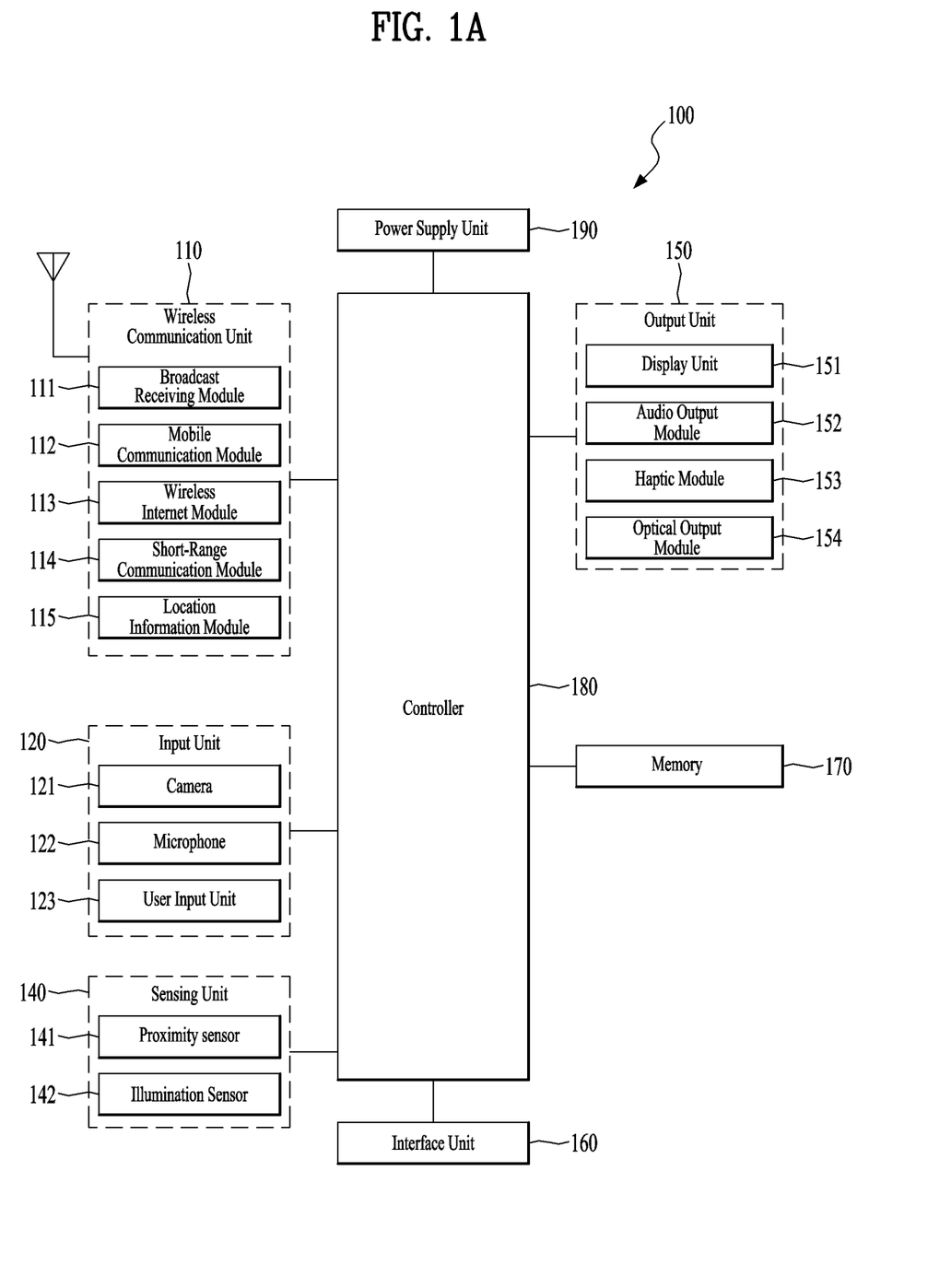
FIG. 1A is a block diagram to describe a mobile terminal related to the present disclosure.
Figure 1B:
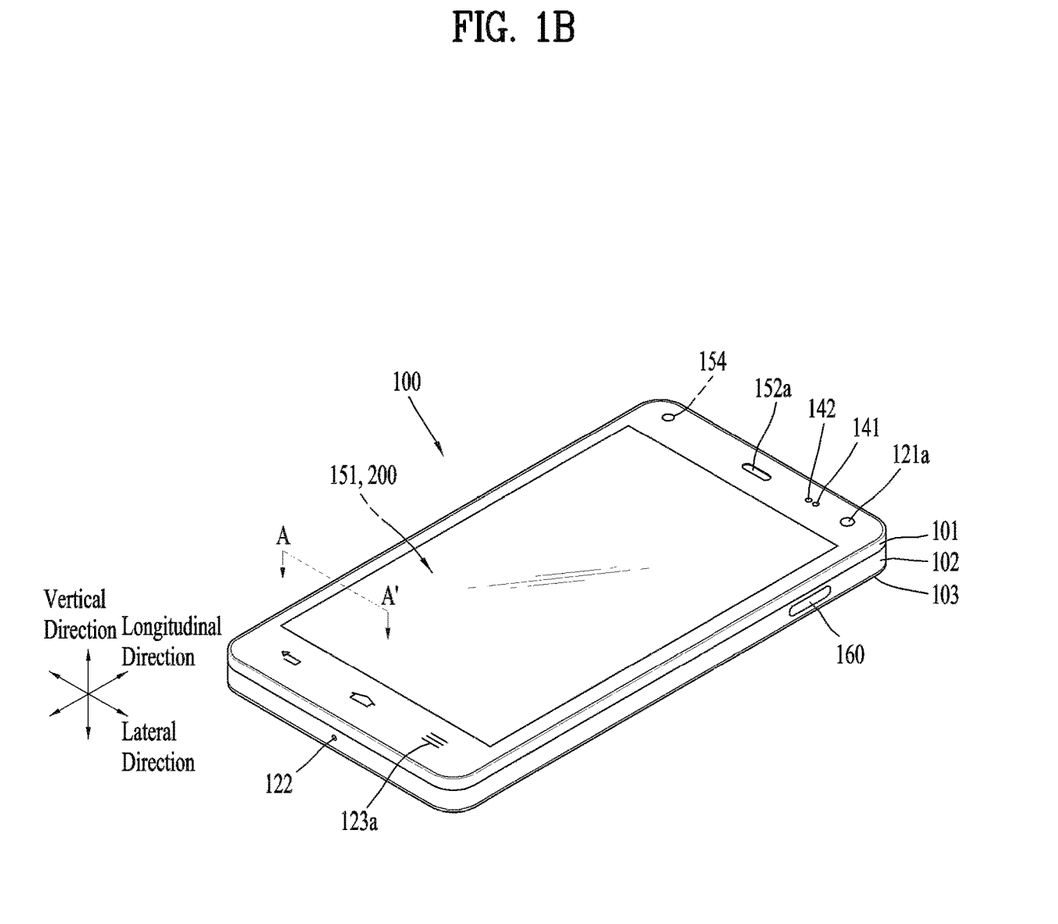
FIGS. 1B and 1C are diagrams showing conceptual views showing an example of a mobile terminal related to the present disclosure.
Figure 1C:
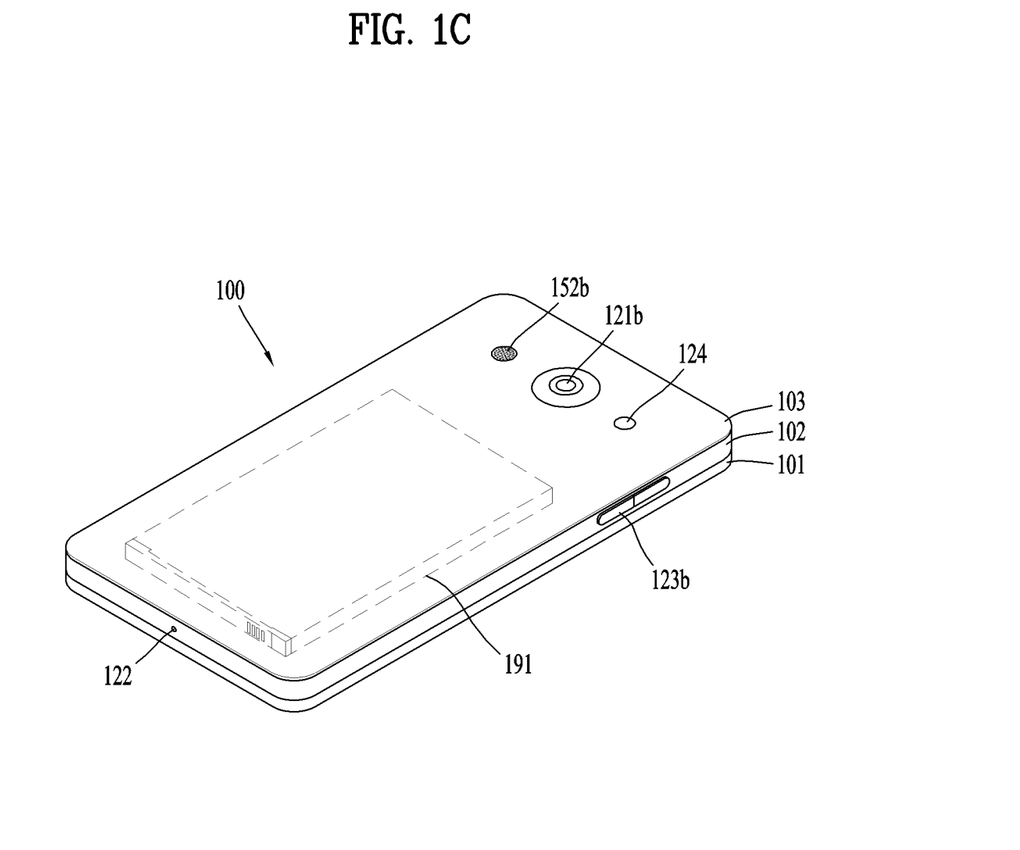

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the components illustrated in FIG. 1A is not a requirement, and that greater or fewer components may alternatively be implemented in the mobile terminal 100.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combine and operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In the followings, a terminal body is used to designate the mobile terminal 100 as a single assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a, 152b, a proximity sensor 141, an illumination sensor 142, an optical output module 154, first and second cameras 121a, 121b, first and second manipulation units 123a, 123b, a microphone 122, an interface unit 160 and the like.

FIGS. 1B and 1C depict certain components as arranged on the mobile terminal. For example, the display unit 151, the first audio output module 152, the proximity sensor 141, the illumination sensor 142, the optical output module 154, the first camera 121a, and the first manipulation unit 123a are located at a front surface of the terminal body, the second manipulation unit 123b, the microphone 122, and the interface unit 160 are located at a side surface of the terminal body, and the second audio output module 152b and the second camera 121b are located at a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application executed at the mobile terminal 100, or user interface (UI)/graphic user interface (GUI) information according to the execution screen information.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 (see FIG. 1A) for supplying power to the mobile terminal 100 is provided to the mobile terminal 100. The power supply unit 190 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

Figure 2:
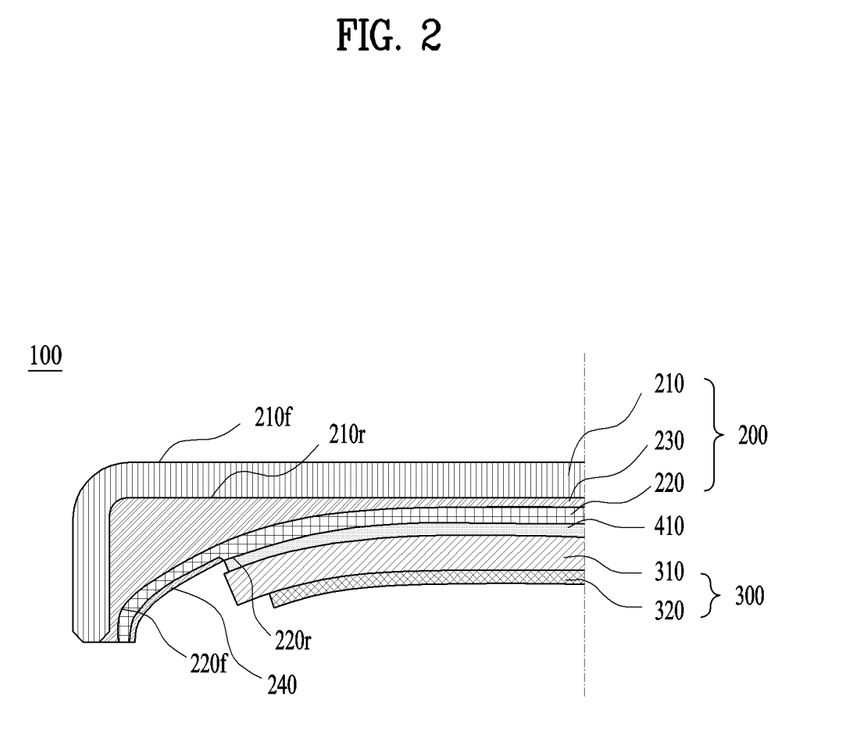
FIG. 2 is a cross-sectional diagram viewed taken along the line A-A' of FIG. 1B.

FIG. 2 is a cross-sectional diagram viewed taken along the line A-A' of FIG. 1B.

The above-described display unit includes a display panel 300 and a window assembly 200.

The display panel 300 may mean a set of elements provided in a manner of being stacked to output an image. The display panel 300 may be configured in various forms such as LCD, OLED, micro LED, etc.

For example, the display panel 300 may include OLED, and more particularly, POLED. In case of POLED, it is advantageous in that the display panel 300 may be configured in a curved shape. The display panel 300 of the POLED type may include a plurality of panels 310 including an organic layer and the like and may further include a back plate 320 configured to protect rear sides of a plurality of the panels and secure rigidity if necessary.

FIG. 2 assumes the display panel 300 of the POLED type, by which features of the present disclosure are non-limited. Therefore, the display panel 300 is applicable to a display panel 300 of the LCD type, the micro LED type, etc. Yet, in case that a shape of the display panel 300 has a curvature or is bendable like the POLED type, the features of the present disclosure are appropriately applicable.

The window assembly 200 is provided to a front side of the display panel 300.

Although the display panel 300 may maintain a contact state without being fixed to the window assembly 200, it is generally attached and coupled to the window assembly 200. For an integrated display assembly, the display panel 300 may include an adhesive member 410 to be fixed to the window. The adhesive member 410 may include an OCA film.

As described above, considering the demands and manufacturing costs for windows of various types such as a window having different thickness for each region and the like, the present disclosure suggests the window assembly 200 configured in a manner that two window members overlap with each other.

An outer window 210 of the window assembly 200 forms a front exterior of the mobile terminal 100.

An inner window 220 of the window assembly 200 is provided to a rear side 210r of the outer window. The inner window 220 forms a surface directly contacting with the display panel 300.

The outer window 210 and the inner window 200 may be configured in a manner of forming a spaced space in-between. The outer window 210 may be formed to cope with the requirements for a front shape of the mobile terminal 100, and the inner window 2210 may be formed to correspond to a shape of the display panel 300. Namely, this means that a cross-section of the outer window 210 is different from that of the inner window 220.

Consequently, the window assembly 200 constructed with the outer window 210 and the inner window 220 may have thickness that varies according to a region. So to speak, a vertical distance from the outer window to the inner window 220 for a first spot is different from a vertical distance from the outer window to the inner window 220 for a second spot that is not the first spot.

Each of the outer window 210 and the inner window 220 may be fabricated by the conventional compression system. Namely, each of the windows may obtain a desired shape by deforming a planar glass fabricated in the same thickness in a manner of compressing an upper mold and a lower mold under high temperature and pressure. Therefore, the thickness of each window may be uniform.

An embodiment of implementing a front side of a window of the mobile terminal 100 into a knocked-over shape of '⊏' is described as follows.

Referring to FIG. 2, the outer window 210 of the mobile terminal 100 according to the present disclosure may have a knocked-over '⊏' shape and the inner window 220 may have a smoothly-curved curvature shape.

On the other hand, if a single window of the related art is configured, an inner lateral side of the window has a knocked-over '⊏' shape. Although the display panel 300 of the POLED type for implementing a relatively free shape is provided, it is difficult to cope with an edge that is bent at 90°.

Therefore, the inner window 220 configured with the smooth curvature like the mobile terminal 100 of the present disclosure is separately provided, thereby coping with the shape of the display panel 300.

A resin 230 fills the space between the outer window 210 and the inner window 220, thereby fixing the outer window 210 and the inner window 220 to each other. The resin may include a transparent material, and more particularly, a UV-hardened type material.

The boundaries of the outer window 210 and the inner window 220 may be configured to be aligned with each other. If the boundaries are aligned with each other, an opening is not formed, whereby the resin 230 filling the space may not leak externally.

Figure 3:
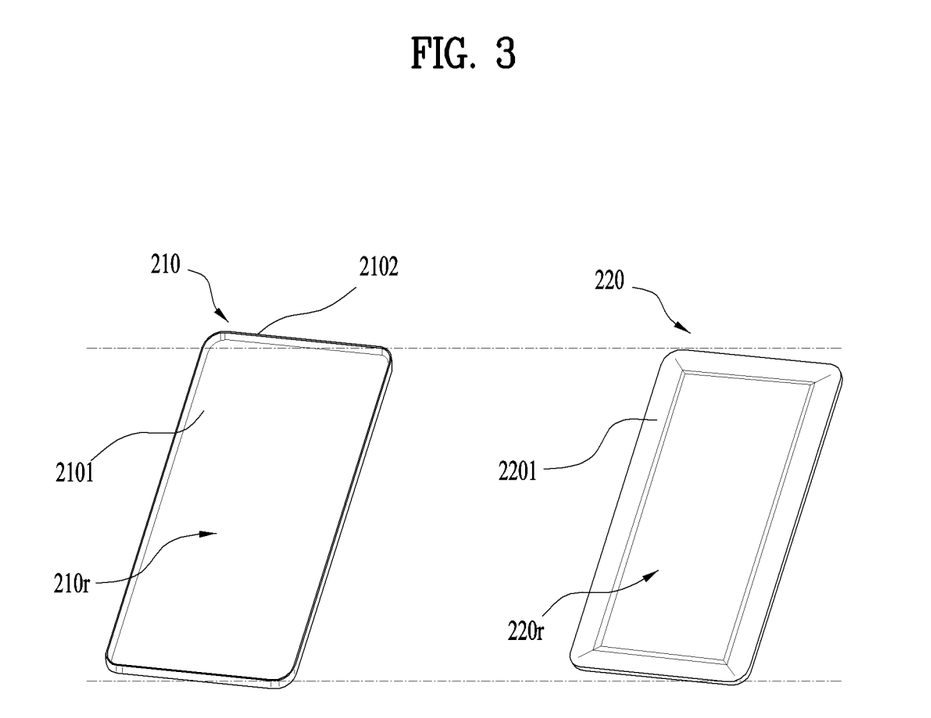
FIG. 3 is a perspective diagram of each rear side of outer and inner windows related to one embodiment of the present disclosure.

FIG. 3 is a perspective diagram of each rear side of the outer and inner windows 210 and 220 related to one embodiment of the present disclosure.

For one example, when the outer window 210 is configured in a 4-side bending shape having a 4-side bent region, the inner window 220 may be configured in the same 4-side bending shape.

For example, the outer window 210 may have a knocked-over '⊏' shape including a front part 2101 that is flat and a bending part 2102 forming lateral sides of the outer window 210 in a manner that top, bottom, left and right sides of the front part 2101 are bent on boundaries 2103 of the front part 2101 by 90°, respectively.

Accordingly, the inner window 220 may be configured in the 4-side bending shape including a bent region 2201 configured in a manner that top, bottom, left and right sides of the inner window 220 are bent smoothly.

The resin 230 may be injected in liquid phase and hardened through a hardening process after the injection.

Figure 4:
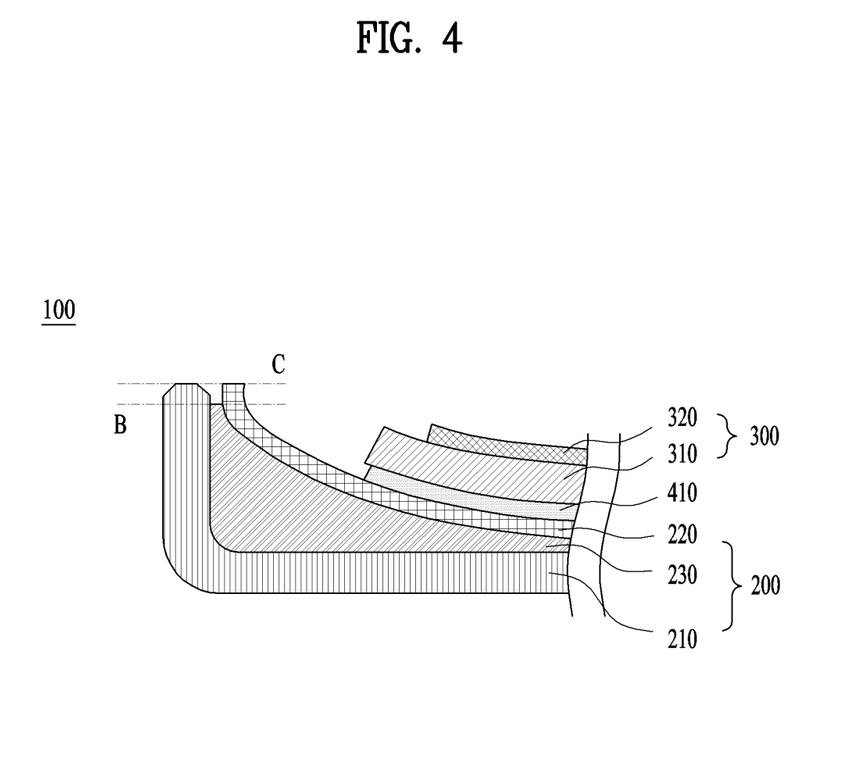
FIGS. 4 to 6 are cross-sectional diagrams of three embodiments taken along the line A-A' of FIG. 1B.
Figure 5:
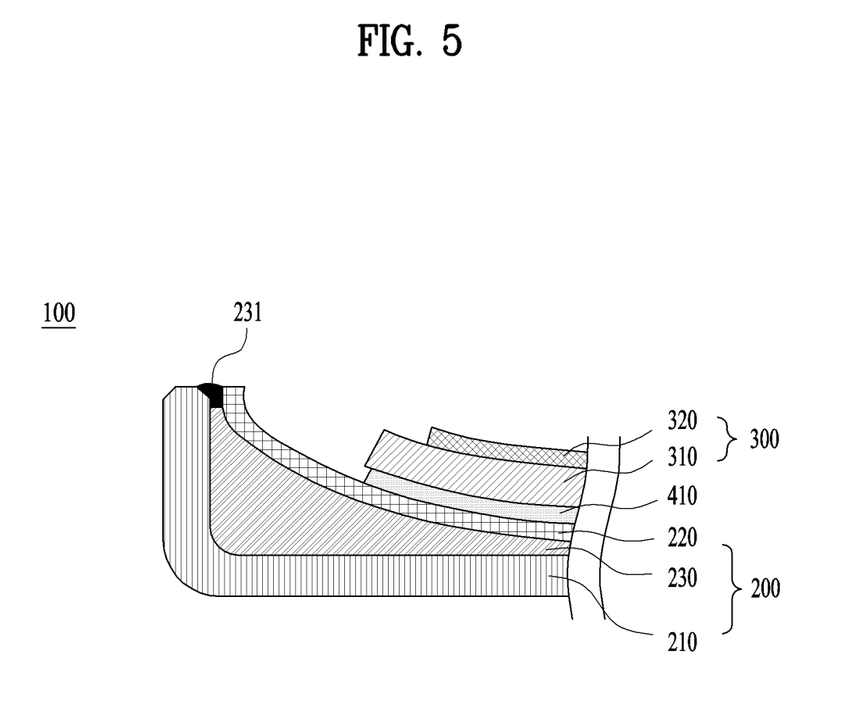
Figure 6:
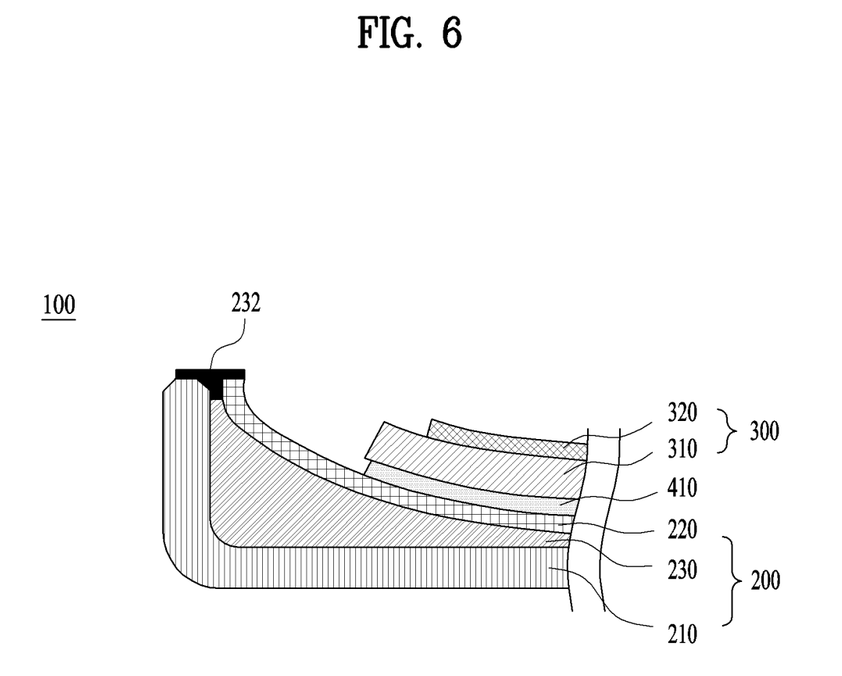

FIGS. 4 to 6 are cross-sectional diagrams of three embodiments taken along the line A-A' of FIG. 1B.

In order to prevent the resin 230 from leaking out, as shown in FIG. 4, a predetermined appropriate amount of the resin 230 may be injected so as to prevent the resin 230 from overflowing before being hardened. When the window assembly 200 is turned over, an outer boundary B formed by the resin 230 may be located at the level equal to or lower than a boundary C formed by the inner window 220 and the outer window 210.

Alternatively, as shown in FIG. 5 or FIG. 6, a sealing part 231/232 may be provided between the outer window 210 and the inner window 220.

Referring to FIG. 5, the sealing part may include a resin-type sealing part 231 changed from liquid into solid through a hardening process like the above-described resin 230.

Once the outer window 210 and the inner window 220 are stacked, the resin 230 is injected. Thereafter, the resin-type sealing part 231 may be coated on the boundary and then hardened. Here, the physical property of the resin-type sealing part 231 may include a material that is hardened faster than the resin 230.

Alternatively, as shown in FIG. 6, the sealing part may include a cap-type sealing part 232 provided as a solid cap to fill up a gap between the outer window 210 and the inner window 220.

Figure 7:
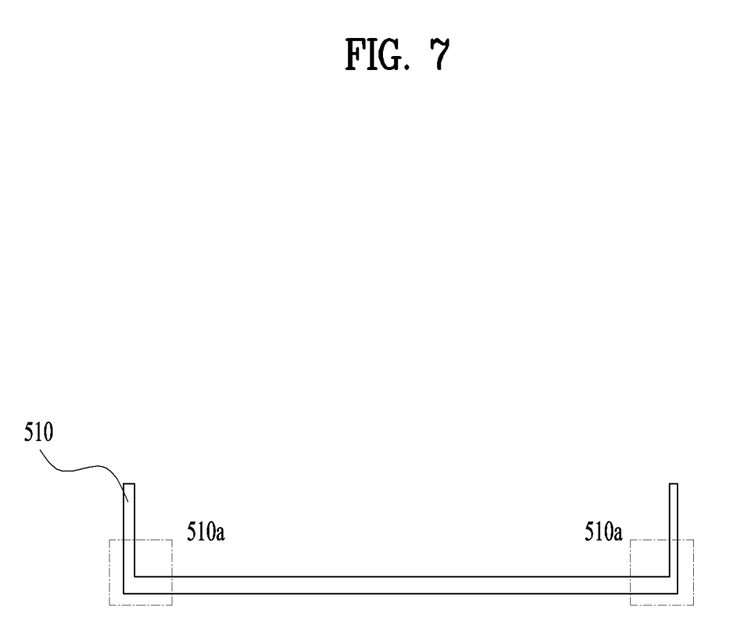
FIG. 7 is a cross-sectional diagram showing a window of a related art.

FIG. 7 is a cross-sectional diagram showing a window of a related art.

A window should, in principle, undergo a polishing process for the incident and exit surfaces of light. This is because if there is a window face that is not polished, an entering or exiting light will scatter from that side, causing interference in the field of vision and loss of light.

Meanwhile, as shown in FIG. 7, in case of forming a window 510 of a '⊏' shape with a single glass of the related art, an inner lateral region forms a recessed corner 510a. Since a polishing member for a polishing process has difficulty in contacting with the recessed corner 510a, it is highly probable that the polishing process is not performed on the recessed corner 510a.

Referring to FIG. 2 again, since each of the outer window front side 210f and the inner window rear side 220r does not form the recessed corner 510a, the polishing process is facilitated.

In some implementations, in case of applying the resin 230 having a refractive index similar to the physical property of the window 210/220, the light scattering problem can be solved without performing the polishing process on the outer window rear side 210r and the inner window front side 220f.

In case of injecting the resin 230 having the refractive index similar to the physical property of the window 210/220, since there is almost no difference of the refractive index despite that the outer window rear side 210r fails to undergo the polishing process, light can be transmitted without interfacial-recognition. In addition, since there is almost no difference of the refractive index despite that the inner window front side 220f fails to undergo the polishing process, light can be transmitted without interfacial-recognition.

For the above reasons, the polishing process may be just performed on the front and rear sides of the window assembly 200.

For one example, when the refractive index of each of the outer window 210 and the inner window 220 is 1.5, the resin 230 may employ EDL030T having a refractive index 1.48.

A print layer 240 may be provided to the window assembly 200. The print layer 240 covers members except the display panel 300, thereby preventing components within the window assembly 200 from being visible unnecessarily.

If the polishing process is not performed on the outer window rear side 210r and the inner window front side 220f, the print layer 240 is preferably provided to the inner window rear side 220r. If the print layer 240 is provided to the unpolished outer window rear side 210r or the unpolished inner window front side 220f, the uneven surface may cause the peel-off of the print layer 240 or irregular visibility.

Yet, if the outer window rear side 210r and the inner window front side 220f are polished as well, the print layer 240 may be applied to all regions of the outer window rear side, the inner window front side 220f and the inner window rear side 220r.

As the resin 230 having the bonding function is provided between the outer window 210 and the inner window 220, a separate film or coating for the scattering prevention, which used to be applied to the related art window, may be skipped.

In addition, by applying the resin 230 having color or texture, an effect of design may be provided.

Furthermore, as the resin 230 is made of soft material, it may bring an effect of external shock absorption.

Mode for Disclosure

It will be appreciated by those skilled in the art that various modifications and variations can be made in the present disclosure without departing from the spirit or scope of the disclosures.

The above detailed description shall not be construed restrictively in all respects and shall be taken into account as illustrative. Thus, it is intended that the present disclosure covers the modifications and variations of this disclosure provided they come within the scope of the appended claims and their equivalents.

INDUSTRIAL APPLICABILITY

The above features are applicable to mobile terminals related to this disclosure singly or in combination.

What is claimed is:

1. A mobile terminal, comprising:
a display panel; and
a window assembly provided to a front side of the display panel, the window assembly comprising:
  an outer window forming a front exterior;
  an inner window provided to a rear side of the outer window in a manner of forming a space apart from the outer window; and
  a resin provided to the space to fix the outer window and the inner window thereto,
wherein in a vertical or horizontal cross section of the window assembly, a curvature of the outer window is different from a curvature of the inner window.

2. The mobile terminal of claim 1, wherein in the vertical or horizontal cross section of the window assembly, a vertical distance from the outer window to the inner window at edges of the vertical or horizontal cross section is different from a vertical distance from the outer window to the inner window at a middle of the vertical or horizontal cross section.

3. The mobile terminal of claim 2, the outer window comprising:
a flat front part; and
a bending part forming a lateral side in a manner that top, bottom, left and right sides of the front part are bent on boundaries of the front part, respectively.

4. The mobile terminal of claim 2, wherein each of the outer and inner windows has a 4-side bending shape.

5. The mobile terminal of claim 4, wherein a boundary of the outer window is aligned with a boundary of the inner window, and
wherein a sealing part is further provided to a region in which the boundary of the outer window and the boundary of the inner window meet each other.

6. The mobile terminal of claim 1, wherein each of a thickness of the outer window and a thickness of the inner window is uniform.

7. The mobile terminal of claim 1, wherein a front side of the outer window and a rear side of the inner window are polished, and
wherein the outer window, the resin and the inner window have the same refractive index.

8. The mobile terminal of claim 7, further comprising:
a colored print layer covering a periphery of the display panel,
wherein the print layer is formed on the rear side of the inner window.

* * * * *